United States Patent
Sugama (10) Patent No.: US 9,772,449 B2
(45) Date of Patent: Sep. 26, 2017

(54) WAVELENGTH MULTIPLEXER/DEMULTIPLEXER AND OPTICAL MODULE

(71) Applicant: FUJITSU LIMITED, Kawasaki-shi, Kanagawa (JP)

(72) Inventor: Akio Sugama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/299,432

(22) Filed: Oct. 20, 2016

(65) Prior Publication Data
US 2017/0139143 A1    May 18, 2017

(30) Foreign Application Priority Data

Nov. 13, 2015    (JP) .................................. 2015-223035

(51) Int. Cl.
*G02B 6/28* (2006.01)
*G02B 6/293* (2006.01)
*G02B 6/42* (2006.01)

(52) U.S. Cl.
CPC ....... *G02B 6/29367* (2013.01); *G02B 6/2938* (2013.01); *G02B 6/428* (2013.01)

(58) Field of Classification Search
CPC .. G02B 6/29367; G02B 6/2938; G02B 6/428; G02B 6/29364; G02B 6/29365
See application file for complete search history.

(56) References Cited

U.S. PATENT DOCUMENTS

| | | | | |
|---|---|---|---|---|
| 6,008,920 A | * | 12/1999 | Hendrix | G02B 6/2938 359/633 |
| 6,198,864 B1 | * | 3/2001 | Lemoff | G02B 6/29367 385/24 |
| 6,292,298 B1 | * | 9/2001 | Glance | G02B 6/29358 359/583 |
| 6,775,439 B2 | * | 8/2004 | Takano | G02B 6/12007 385/129 |
| 7,002,696 B1 | * | 2/2006 | Miron | G02B 6/29358 356/519 |
| 8,908,281 B2 | * | 12/2014 | Fu | G02B 6/29365 359/634 |
| 9,323,013 B2 | * | 4/2016 | Shao | G02B 6/4246 |

(Continued)

FOREIGN PATENT DOCUMENTS

JP    61-285413    12/1986
JP    10-335693    12/1998
(Continued)

*Primary Examiner* — Rhonda Peace
(74) *Attorney, Agent, or Firm* — Fujitsu Patent Center (57) ABSTRACT

A wavelength multiplexer and de-multiplexer includes: a reflection member; a first port provided in the reflection member; a plurality of second ports provided in the reflection member to be spaced apart from the first port; and an optical filter on an optical path between the first port and the plurality of second ports, wherein a plurality of reflection surfaces inclined with respect to the optical filter are formed in the reflection member, a distance of a reflection point from the optical filter in each of the plurality of reflection surfaces becomes smaller as a reflection angle in each of the plurality of reflection surfaces is increased, and each of the plurality of second ports is positioned on a path of light reflected by each of the plurality of reflection surfaces.

15 Claims, 12 Drawing Sheets

(56) References Cited

U.S. PATENT DOCUMENTS

| | | | |
|---|---|---|---|
| 9,551,833 B1 * | 1/2017 | Li | H04J 14/02 |
| 2003/0002101 A1 * | 1/2003 | Kropp | G02B 6/29367 |
| | | | 398/79 |
| 2003/0190126 A1 | 10/2003 | Toyoshima et al. | |
| 2005/0069013 A1 * | 3/2005 | Bhandarkar | G02B 6/4204 |
| | | | 372/102 |
| 2016/0195677 A1 * | 7/2016 | Panotopoulos | G02B 6/4214 |
| | | | 250/227.23 |
| 2017/0139143 A1 * | 5/2017 | Sugama | G02B 6/29367 |

FOREIGN PATENT DOCUMENTS

| | | |
|---|---|---|
| JP | 2000-28851 | 1/2000 |
| JP | 2002-072010 | 3/2002 |
| JP | 2002-169054 | 6/2002 |
| JP | 2014-182224 | 9/2014 |

* cited by examiner

WAVELENGTH MULTIPLEXER/DEMULTIPLEXER AND OPTICAL MODULE

CROSS-REFERENCE TO RELATED APPLICATION

This application is based upon and claims the benefit of priority from the prior Japanese Patent Application No. 2015-223035, filed on Nov. 13, 2015, the entire contents of which are incorporated herein by references.

FIELD

The embodiments discussed herein are related to a wavelength multiplexer/de-multiplexer and an optical module.

BACKGROUND

A wavelength multiplexer/de-multiplexer is used in a wavelength division multiplexing (WDM) communication.

Related techniques are disclosed in, for example, Japanese Laid-Open Patent Publication No. 2002-169054, Japanese Laid-Open Patent Publication No. 2014-182224, Japanese Laid-Open Patent Publication No. 10-335693, Japanese Laid-Open Patent Publication No. 2002-072010, Japanese Laid-Open Patent Publication No. 61-285413, and Japanese Laid-Open Patent Publication No. 2000-028851.

SUMMARY

According to one aspect of the embodiments, a wavelength multiplexer and de-multiplexer includes: a reflection member; a first port provided in the reflection member; a plurality of second ports provided in the reflection member to be spaced apart from the first port; and an optical filter on an optical path between the first port and the plurality of second ports, wherein a plurality of reflection surfaces inclined with respect to the optical filter are formed in the reflection member, a distance of a reflection point from the optical filter in each of the plurality of reflection surfaces becomes smaller as a reflection angle in each of the plurality of reflection surfaces is increased, and each of the plurality of second ports is positioned on a path of light reflected by each of the plurality of reflection surfaces.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

A wavelength multiplexer/de-multiplexer multiplexes a plurality of optical signals having different wavelengths and de-multiplexes the plurality of multiplexed optical signals for each wavelength. There are various types of wavelength multiplexer/de-multiplexer architectures.

For example, a wavelength multiplexer/de-multiplexer uses transmission and reflection of an optical filter. For example, in the wavelength multiplexer/de-multiplexer using transmission and reflection of the optical filter, (the number of wavelengths of WDM-1) types of optical filters are provided and thus, the number of components is increased. A high accuracy may be required for mounting and assembling of optical components and thus, manufacturing of the wavelength multiplexer/de-multiplexer may become difficult due to the increase of the number of components.

For example, the wavelength multiplexer/de-multiplexer uses a characteristic that when light is made obliquely incident on an optical filter, an operating wavelength of a filter is shifted to a short wavelength (blue shift). In order to select a wavelength by a single type of optical filter equipped in the wavelength multiplexer/de-multiplexer, an incidence angle to the optical filter is changed. The adjustment of the incidence angle like this is performed by allowing the light to be reflected plural times between reflection surfaces which are non-parallel to each other. For example, the incidence angle is increased or decreased in a stepwise manner using a characteristic that an angle is increased or decreased by $2\theta$ each time when the light is reflected between two reflection surfaces that have an angle of $\theta$ therebetween. For example, the light is reflected by a taper configured by a reflection surface and an optical filter and thus, an incidence angle is increased in a stepwise manner.

For example, in the wavelength multiplexer/de-multiplexer using a blue shift, the interval between ports on a side of individual wavelength may be changed in a stepwise manner accompanied by the stepwise change in incidence angle. For that reason, the ports on the side of individual wavelength may not be arranged at equal intervals. For example, in the wavelength multiplexer/de-multiplexer using blue shift, a degree of freedom in design may be low and usability for a user may be poor. For example, the interval between the ports becomes larger as the incidence angle is increased and thus, miniaturization of the device may become difficult.

Figure 1:
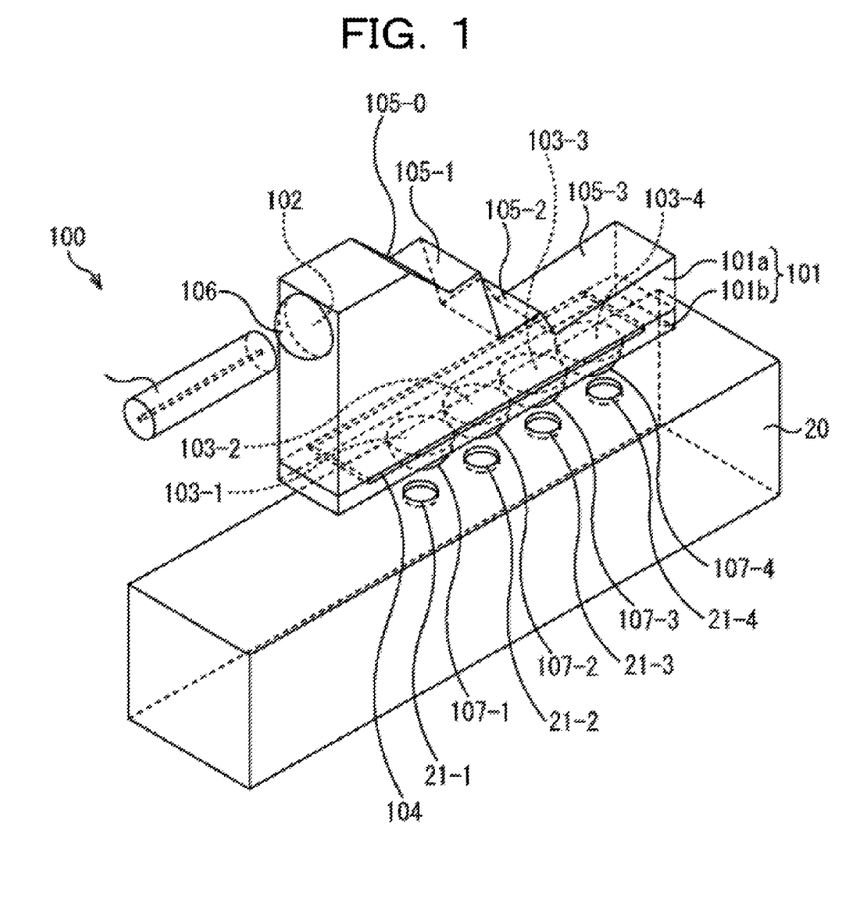
FIG. 1 illustrates an example of a perspective view of a wavelength multiplexer/de-multiplexer.
Figure 2:
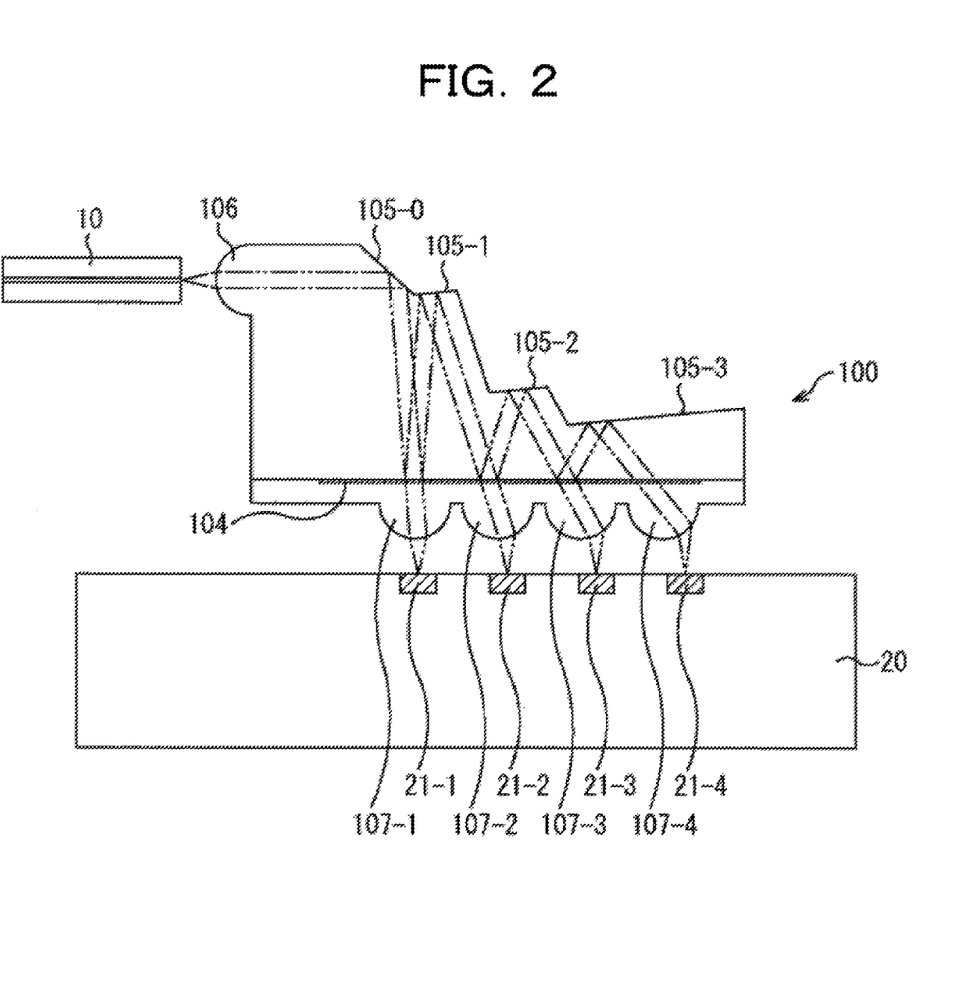
FIG. 2 illustrates an example of a cross-sectional view of the wavelength multiplexer/de-multiplexer.
Figure 3:
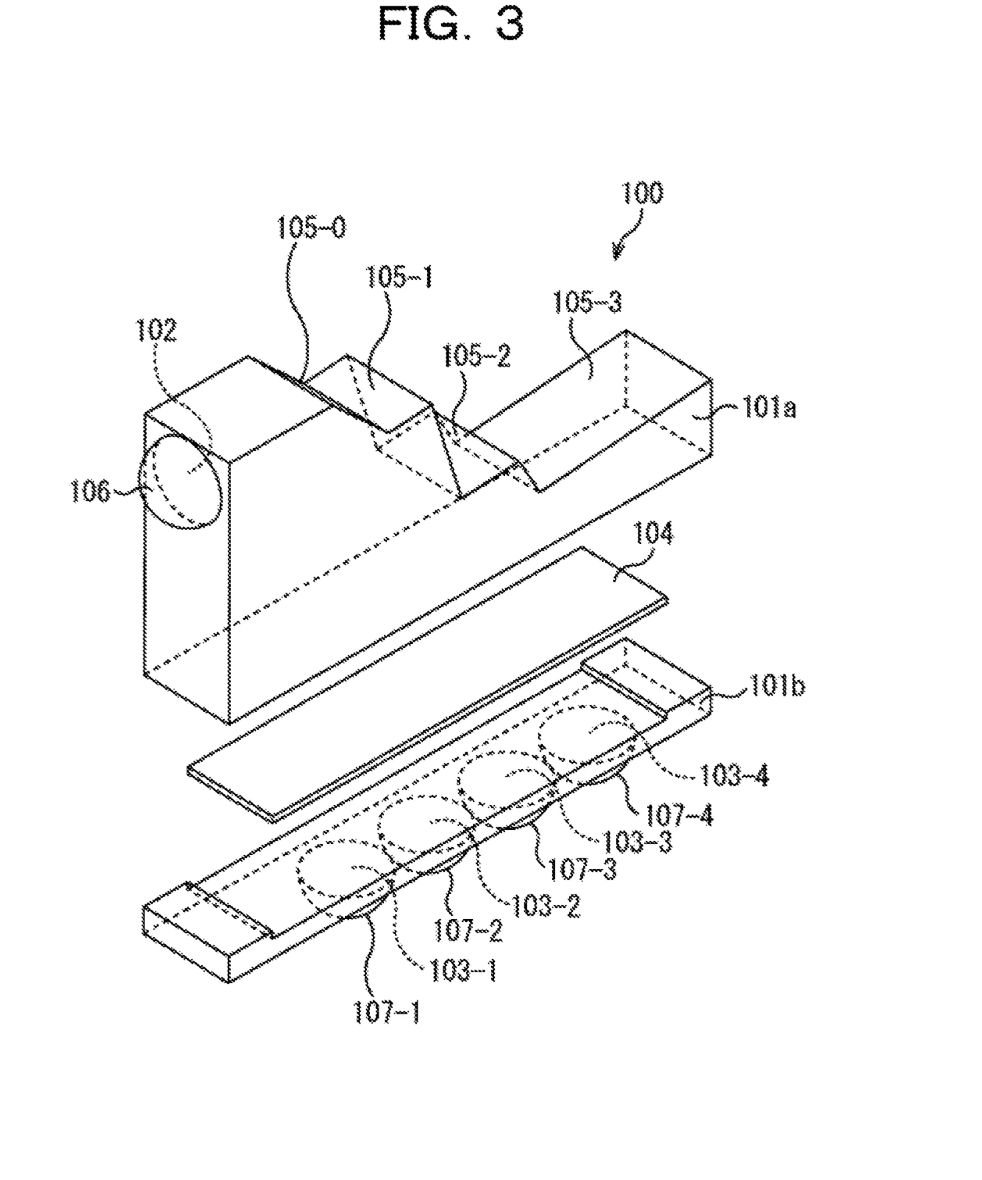
FIG. 3 illustrates an example of an exploded perspective view of the wavelength multiplexer/de-multiplexer.

FIG. 1 illustrates an example of a perspective view of a wavelength multiplexer/de-multiplexer. FIG. 2 illustrates an example of a cross sectional view of the wavelength multiplexer/de-multiplexer. FIG. 3 illustrates an example of an exploded perspective view of the wavelength multiplexer/de-multiplexer.

As illustrated in FIG. 1 and FIG. 2, a wavelength multiplexer/de-multiplexer 100 includes a reflection member 101, a port 102 provided in the reflection member 101, and m ports 103-1 to 103-m provided in the reflection member 101 to be spaced apart from the port 102. For example, a lens 106 is provided in the port 102 and lenses 107-1 to 107-m are provided in the ports 103-1 to 103-m. m is an integer number of two or more and is, for example, four in FIG. 1 and FIG. 2. The wavelength multiplexer/de-multiplexer 100 also includes an optical filter 104 on an optical path between the port 102 and the ports 103-1 to 103-m. A wavelength of the light transmitted through the optical filter 104 becomes shorter as an incidence angle increases due to a blue shift. In the reflection member 101, an input/output reflection surface 105-0 which reflects the light between the port 102 and the optical filter 104, and n reflection surfaces 105-1 to 105-n which are inclined to the optical filter 104 and have different distances from the optical filter 104 are formed. n is an integer number of one or more and is, for example, three in FIG. 1 and FIG. 2.

For example, the inclination angles of the reflection surfaces 105-1 to 105-3 to the optical filter 104 may be constant. For example, as the distance from the port 102 is increased, a distance of a reflection point from the optical filter 104 in each of the reflection surfaces 105-1 to 105-3 becomes smaller and a reflection angle in each of the reflection surfaces 105-1 to 105-3 becomes larger. Each of the ports 103-1 to 103-4 is positioned in the optical path of the light reflected by each of the reflection surfaces 105-0 to 105-3. As illustrated in FIG. 3, the reflection member 101 includes a main part 101a and a filter supporting part 101b and the optical filter 104 is sandwiched between the main part 101a and the filter supporting part 101b. For example, a dielectric multilayer film filter may be used as the optical filter 104. The dielectric multilayer film filter has a sharp selection ratio with respect to the wavelength. The port 102 may be an example of a first port and the ports 103-1 to 103-m may be an example of a second port.

The port 102 is coupled to an optical fiber 10, and an optical circuit board 20 is disposed to face the ports 103-1 to 103-m. The optical circuit board 20 includes m optical elements 21-1 to 21-m that perform transmission and reception of an optical signal with the ports 103-1 to 103-m. Each of the optical elements 21-1 to 21-m may be, for example, a laser diode (LD), a photodiode (PD), a mirror, or a grating.

In the following, an example of an operation of the wavelength multiplexer/de-multiplexer 100 will be described. For example, the optical elements 21-1 to 21-m may be light receiving elements and the wavelength multiplexer/de-multiplexer 100 may perform wavelength de-multiplexing. In this case, the light emitted from the optical fiber 10 is converted into parallel beam by the lens 106 of the port 102. The light is reflected by the input/output reflection surface 105-0 and is made incident on the optical filter 104. When the light is made incident on the optical filter 104, only the light of the wavelength according to the incidence angle is transmitted through the optical filter 104, arrives at the port 103-1, and is condensed on the optical element 21-1 through a lens 107-1. The light having a wavelength which is not transmitted through the optical filter 104 is reflected by the optical filter 104 and is reflected again by the reflection surface 105-1. The reflection surface 105-1 is inclined to the optical filter 104 and thus, the light reflected by the reflection surface 105-1 is made incident on the optical filter 104 at an incidence angle different from the light reflected by the input/output reflection surface 105-0. When the light is made incident on the optical filter 104, only the light of the wavelength according to the incidence angle is transmitted through the optical filter 104, arrives at the port 103-2, and is condensed on the optical element 21-2 through a lens 107-2. As described above, the light of specific wavelengths is condensed also on the optical element 21-3 and the optical element 21-4 by being subjected to repetitive reflection and transmission described above. With this, wavelength de-multiplexing is performed.

In the following, another example of an operation of the wavelength multiplexer/de-multiplexer 100 will be described. For example, the optical elements 21-1 to 21-m may be light emitting elements and the wavelength multiplexer/de-multiplexer 100 may perform wavelength multiplexing. In this case, the light of a specific wavelength emitted from the optical element 21-1 is converted into parallel beam by the lens 107-1 of the port 103-1. The light is transmitted through the optical filter 104, is reflected by the input/output reflection surface 105-0, and arrives at the port 102. The light of the specific wavelength emitted from the optical element 21-2 is converted into parallel beam by the lens 107-2 of the port 103-2. The light is transmitted through the optical filter 104, is reflected by the reflection surface 105-1, and is made incident on the optical filter 104. Due to the relationship between the wavelength and the incidence angle, the light is reflected by the optical filter 104, is reflected again by the input/output reflection surface 105-0, and arrives at the port 102. The lights of the specific wavelengths emitted from the optical element 21-3 and the optical element 21-4 also arrive at the port 102 by being subjected to repetitive transmission and reflection described above. The lights having four types of the wavelength are condensed on the optical fiber 10 by the lens 106. With this, wavelength multiplexing is performed.

Figure 4:
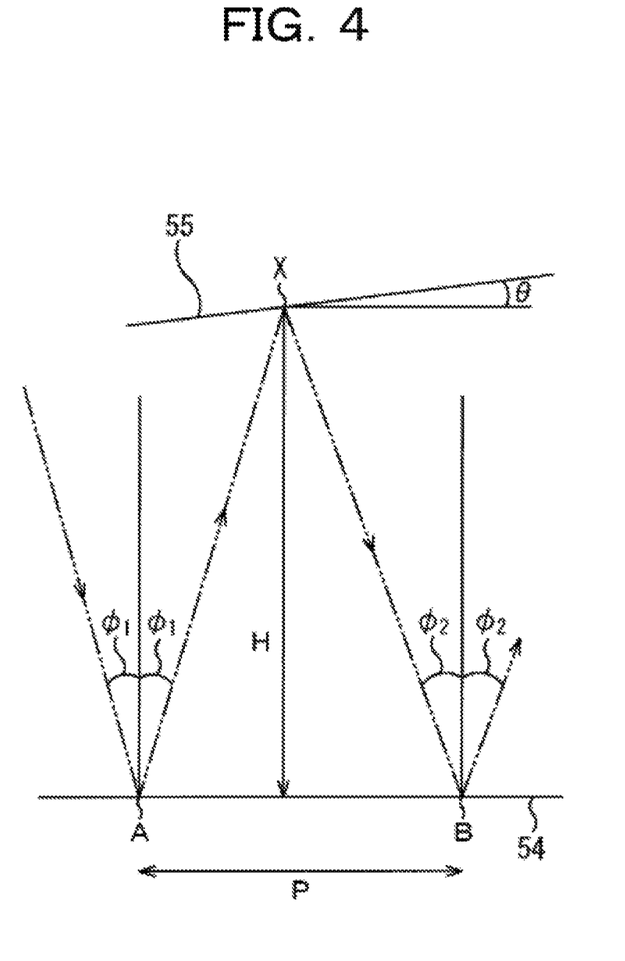
FIG. 4 illustrates an example of a relationship between an inclination angle of a reflection surface with respect to an optical filter and an optical path.

FIG. 4 illustrates an example of a relationship between an inclination angle of a reflection surface with respect to an optical filter and an optical path.

For example, the light incident on a point A on the optical filter 54 at an incidence angle $\phi_1$ is reflected on the point A, is reflected on a reflection point X on a reflection surface 55, and is made incident on a point B on the optical filter 54 at an incidence angle $\phi_2$. In this case, when it is assumed that an inclination angle of the reflection surface 55 with respect to the optical filter 54 is $\theta$, a distance between the reflection point X and the optical filter 54 is H, and a distance between the point A and the point B is P, the following relationship is established geometrically.

$$H = P/(\tan\varphi 1 + \tan\varphi 2)$$
$$= P/(\tan\varphi 1 + \tan(\varphi 1 + 2\theta))$$

For that reason, in a case where the inclination angle $\theta$ and the distance P between the incidence points on the optical filter 54 is fixed, when the incidence angle $\phi_1$ with respect to the optical filter 54, through which the optical signal, which is transmitted and received by the optical element, is transmitted, is specified according to the wavelength of the optical signal, the distance between the reflection point X and the optical filter 54 is determined.

A structure of the reflection surfaces 105-0 to 105-n may be designed by beam tracking simulation in consideration of, for example, a blue shift of the optical filter 104.

Although the incidence angle and the emission angle of each of the optical elements 21-1 to 21-m may not always coincide with an angle of the light transmitted through the optical filter 104, for example, as illustrated in FIG. 3, the relationship between the angles may be adjusted by the lenses 107-1 to 107-m. Accordingly, the structure of the lenses 107-1 to 107-m may be designed in consideration of the positions of the optical elements 21-1 to 21-m. The pitches of the optical elements 21-1 to 21-m may be freely set and for example, the pitches may be set to a constant pitch. For example, the pitches of the optical elements 21-1 to 21-m may not be constant.

Figure 5A:
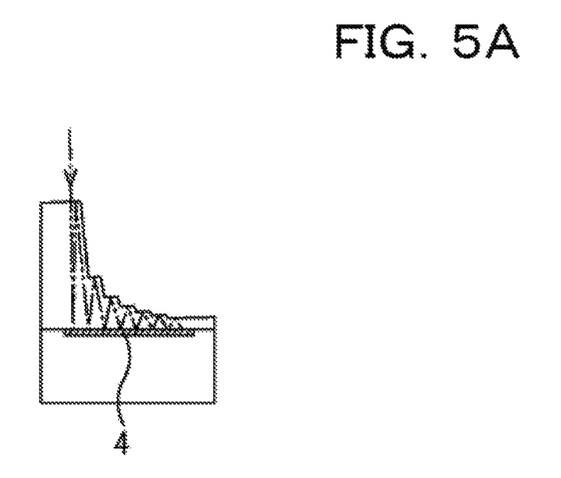
FIG. 5A and FIG. 5B illustrate examples of optical paths within two types of wavelength multiplexers/de-multiplexers.
Figure 5B:
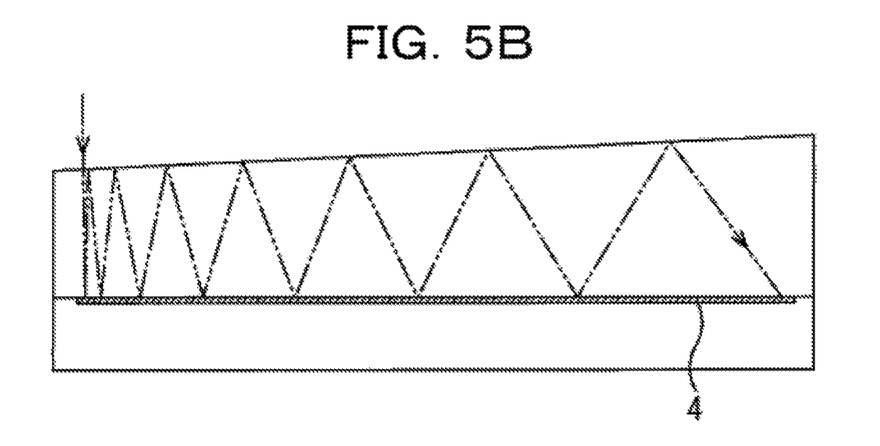

For example, the distances of the plurality of reflection surfaces from the optical filter become smaller as the reflection angle in the reflection surface is increased and thus, a certain effect may be obtained. FIG. 5A and FIG. 5B illustrate examples of optical paths within two types of wavelength multiplexers/de-multiplexers. In FIG. 5A and FIG. 5B, only the optical paths of the light reflected by the optical filter are displayed.

As described above, in a case where the distances of the plurality of reflection surfaces from the optical filter 4 become smaller as the reflection angle in the reflection surface is increased, as illustrated in FIG. 5A, the distance between the incidence points on the optical filter 4 becomes substantially constant. For example, in the wavelength multiplexer/de-multiplexer in which only a single reflection surface is provided, as illustrated in FIG. 5B, the distance between the incidence points on the optical filter 4 becomes large inevitably as the reflection angle in the reflection surface is increased. Such a tendency becomes more noticeable as the number of kinds of wavelengths included in the optical signal is increased, for example the number of types of wavelengths to be multiplexed or de-multiplexed is increased.

Figure 6A:
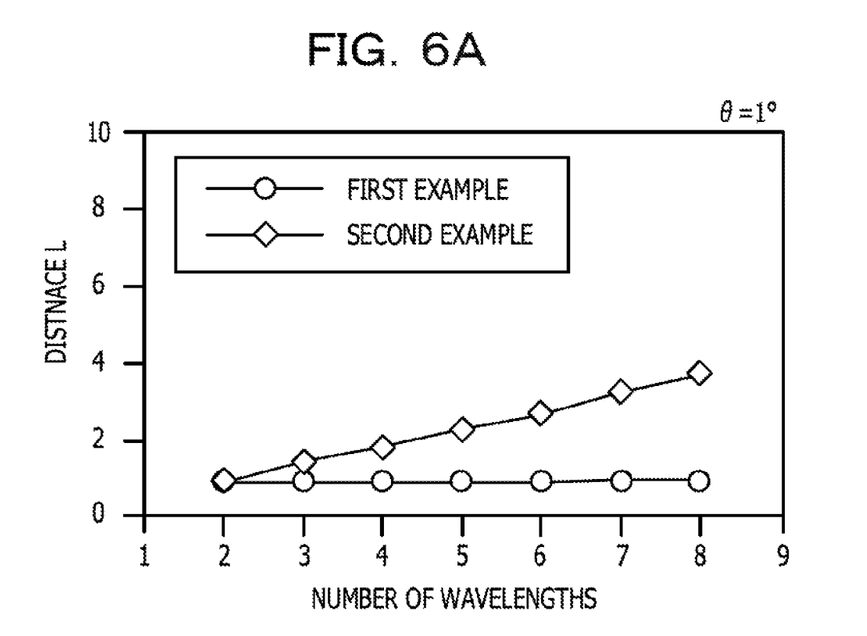
FIG. 6A and FIG. 6B illustrate examples of a relationship between the number of types of wavelengths to be multiplexed and de-multiplexed and a distance L.
Figure 6B:
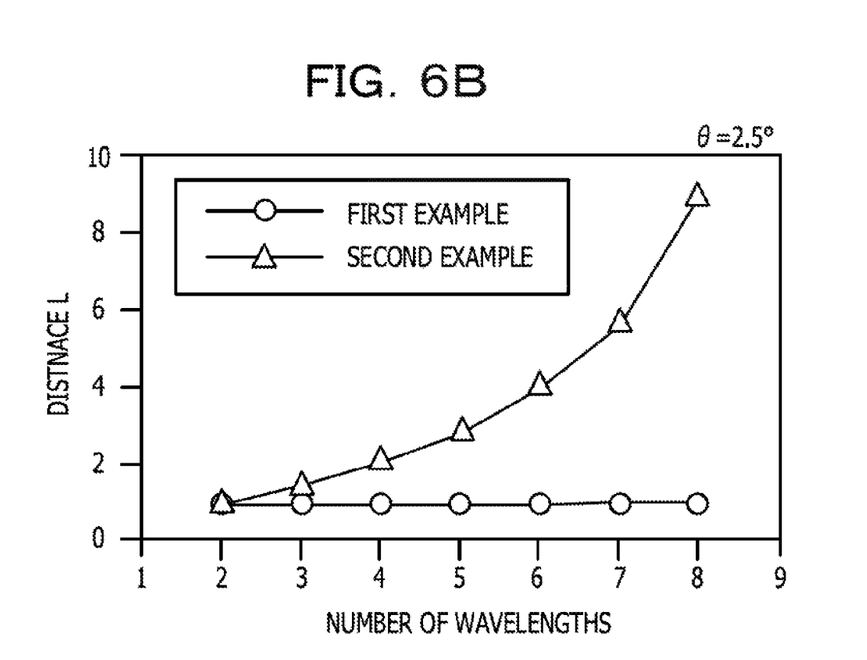

FIG. 6A and FIG. 6B illustrate examples of a relationship between the number of types of wavelengths to be multiplexed and de-multiplexed and a distance L. In FIG. 6A and FIG. 6B, a relationship between the number of types of wavelengths to be multiplexed and de-multiplexed and a distance L from a first incidence point to the last incidence point on the optical filter is illustrated. FIG. 6A illustrates the relationship when the inclination angle $\theta$ is 1° and FIG. 6B illustrates the relationship when the inclination angle $\theta$ is 2.5°. In the vertical axis of FIG. 6A and FIG. 6B, values, which are obtained when the distance L in a structure corresponding to that illustrated in the FIG. 5A is set as 1.0, are indicated. As illustrated in FIG. 6A and FIG. 6B, in a first example corresponding to FIG. 1 to FIG. 3, in a case of four wavelengths, the distance L may be decreased to about ½ even when the inclination angle $\theta$ is any of 1° and 2.5°, compared to a second example where only the single reflection surface is provided. In a case of eight wavelengths, the distance L may be decreased to about ¼ when the inclination angle $\theta$ is 1° and to about ⅑ when the inclination angle $\theta$ is 2.5°.

According to the first example, the positions of points, at which the light is transmitted, on the optical filter 104 may be easily adjusted and thus, the intervals between the ports 103-1 to 103-m may be easily adjusted. Accordingly, restrictions on design are relaxed and the miniaturization may become easier. For example, the intervals between the optical elements 21-1 to 21-m as well as the intervals between the ports 103-1 to 103-m may be evenly spaced. The steps in the reflection surfaces 105-0 to 105-n may be formed with high accuracy by, for example, resin molding.

Figure 7:
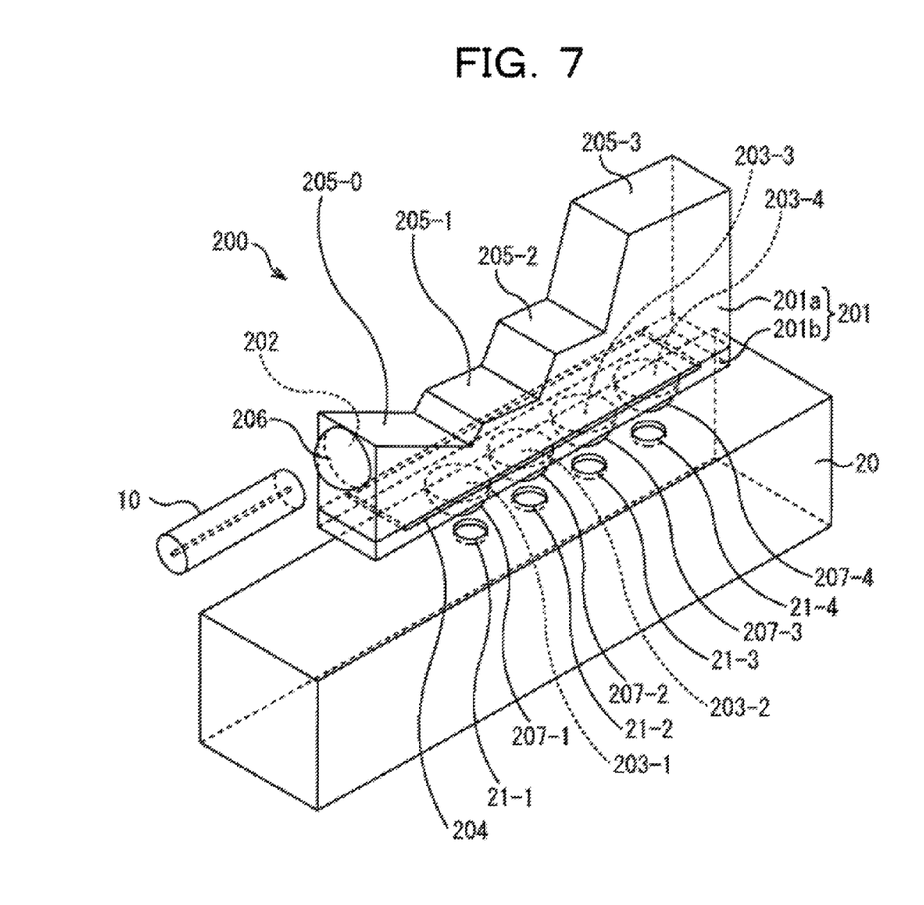
FIG. 7 illustrates another example of a perspective view of the wavelength multiplexer/de-multiplexer.
Figure 8:
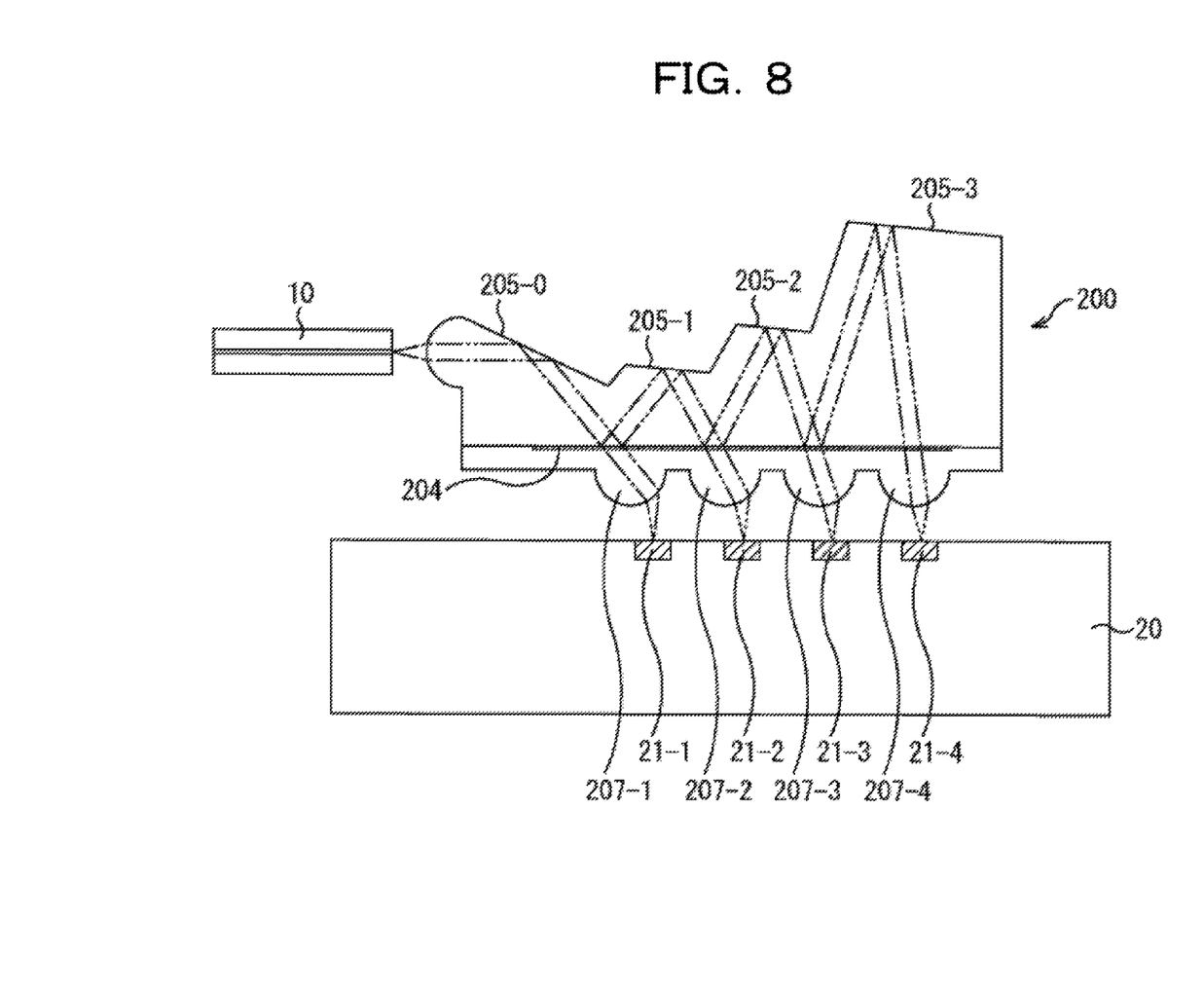
FIG. 8 illustrates another example of a cross-sectional view of the wavelength multiplexer/de-multiplexer.

FIG. 7 illustrates another example of a perspective view of a wavelength multiplexer/de-multiplexer. FIG. 8 illustrates another example of a cross sectional view of the wavelength multiplexer/de-multiplexer.

As illustrated in FIG. 7 and FIG. 8, a wavelength multiplexer/de-multiplexer 200 includes a reflection member 201, a port 202 provided in the reflection member 201, and m ports 203-1 to 203-m provided in the reflection member 201 to be spaced apart from the port 202. For example, a lens 206 is provided in a port 202 and lenses 207-1 to 207-m are provided in ports 203-1 to 203-m. m may be an integer number of two or more and is, for example, four in FIG. 7 and FIG. 8. The wavelength multiplexer/de-multiplexer 200 also includes an optical filter 204 on an optical path between the port 202 and the ports 203-1 to 203-m. A wavelength of the light transmitted through the optical filter 204 becomes shorter as an incidence angle increases due to a blue shift. In the reflection member 201, an input/output reflection surface 205-0 which reflects the light between the port 202 and the optical filter 204, and n reflection surfaces 205-1 to 205-n which are inclined to the optical filter 204 and have different distances from the optical filter 204 are formed. n is an integer number of one or more and is, for example, three in FIG. 7 and FIG. 8.

For example, the inclination angles of the reflection surfaces 205-1 to 205-3 to the optical filter 204 may be substantially constant. For example, as the distance from the port 202 is increased, a distance of the reflection point from the optical filter 204 in each of the reflection surfaces 205-1 to 205-3 becomes larger and a reflection angle in each of the reflection surfaces 205-1 to 205-3 becomes smaller. Each of the ports 203-1 to 203-4 is positioned in the optical path of the light reflected by each of the reflection surfaces 205-0 to 205-3. The reflection member 201 includes a main part 201a and a filter supporting part 201b and the optical filter 204 is sandwiched between the main part 201a and the filter supporting part 201b. For example, a dielectric multilayer film filter may be used as the optical filter 204. The dielectric multilayer film filter has a sharp selection ratio with respect to the wavelength. The port 202 may be an example of a first port and the ports 203-1 to 203-m may be an example of a second port.

Similar to FIG. 1 to FIG. 3, the port 202 is coupled to an optical fiber 10 and an optical circuit board 20 is disposed to face the ports 203-1 to 203-m.

An example of an operation of the wavelength multiplexer/de-multiplexer 200 illustrated in FIG. 7 and FIG. 8 will be described. For example, the optical elements 21-1 to 21-m may be light receiving elements and the wavelength multiplexer/de-multiplexer 200 may perform wavelength de-multiplexing. In this case, the light emitted from the optical fiber 10 is converted into parallel beam by the lens 206 of the port 202. The light is reflected by the input/output reflection surface 205-0 and is made incident on the optical filter 204. When the light is made incident on the optical filter 204, only the light of the wavelength according to the incidence angle is transmitted through the optical filter 204, arrives at the port 203-1, and is condensed on the optical element 21-1 through the lens 207-1. The light having a wavelength which is not transmitted through the optical filter 204 is reflected by the optical filter 204 and is reflected again by the reflection surface 205-1. The reflection surface 205-1 is inclined to the optical filter 204 and thus, the light reflected by the reflection surface 205-1 is made incident on the optical filter 204 at an incidence angle different from the light reflected by the input/output reflection surface 205-0. When the light is made incident on the optical filter 204, only the light of the wavelength according to the incidence angle is transmitted through the optical filter 204, arrives at the port 203-2, and is condensed on the optical element 21-2 through the lens 207-2. As described above, the light of specific wavelengths is condensed also on the optical element 21-3 and the optical element 21-4 by being subjected to repetitive reflection and transmission described above. With this, wavelength de-multiplexing is performed.

In the following, another example of an operation of the wavelength multiplexer/de-multiplexer 200 as illustrated in FIGS. 7 and 8 will be described. For example, the optical elements 21-1 to 21-$m$ may be light emitting elements and the wavelength multiplexer/de-multiplexer 200 may perform wavelength multiplexing. In this case, the light of a specific wavelength emitted from the optical element 21-1 is converted into parallel beam by the lens 207-1 of the port 203-1. The light is transmitted through the optical filter 204, is reflected by the input/output reflection surface 205-0, and arrives at the port 202. The light of the specific wavelength emitted from the optical element 21-2 is converted into parallel beam by the lens 207-2 of the port 203-2. The light is transmitted through the optical filter 204, is reflected by the reflection surface 205-1, and is made incident on the optical filter 204. Due to the relationship between the wavelength and the incidence angle, the light is reflected by the optical filter 204, is reflected again by the input/output reflection surface 205-0, and arrives at the port 202. The light of the specific wavelength emitted from the optical element 21-3 and the light of the specific wavelength emitted from the optical element 21-4 also arrive at the port 202 by being subjected to repetitive transmission and reflection described above. The lights having four types of the wavelength are condensed on the core of the optical fiber 10 by the lens 206. With this, wavelength multiplexing is performed.

Substantially the same effect as that of the wavelength multiplexer/de-multiplexer illustrated in FIG. 1 to FIG. 3 may also be obtained in the wavelength multiplexer/de-multiplexer illustrated in FIG. 7 and FIG. 8. For example, restrictions on design are relaxed and the miniaturization may become easier. For example, the intervals between the optical elements 21-1 to 21-$m$ as well as the intervals between the ports 203-1 to 203-$m$ may be evenly spaced. The steps in the reflection surfaces 205-0 to 205-$n$ may be formed with high accuracy by, for example, resin molding.

Figure 9:
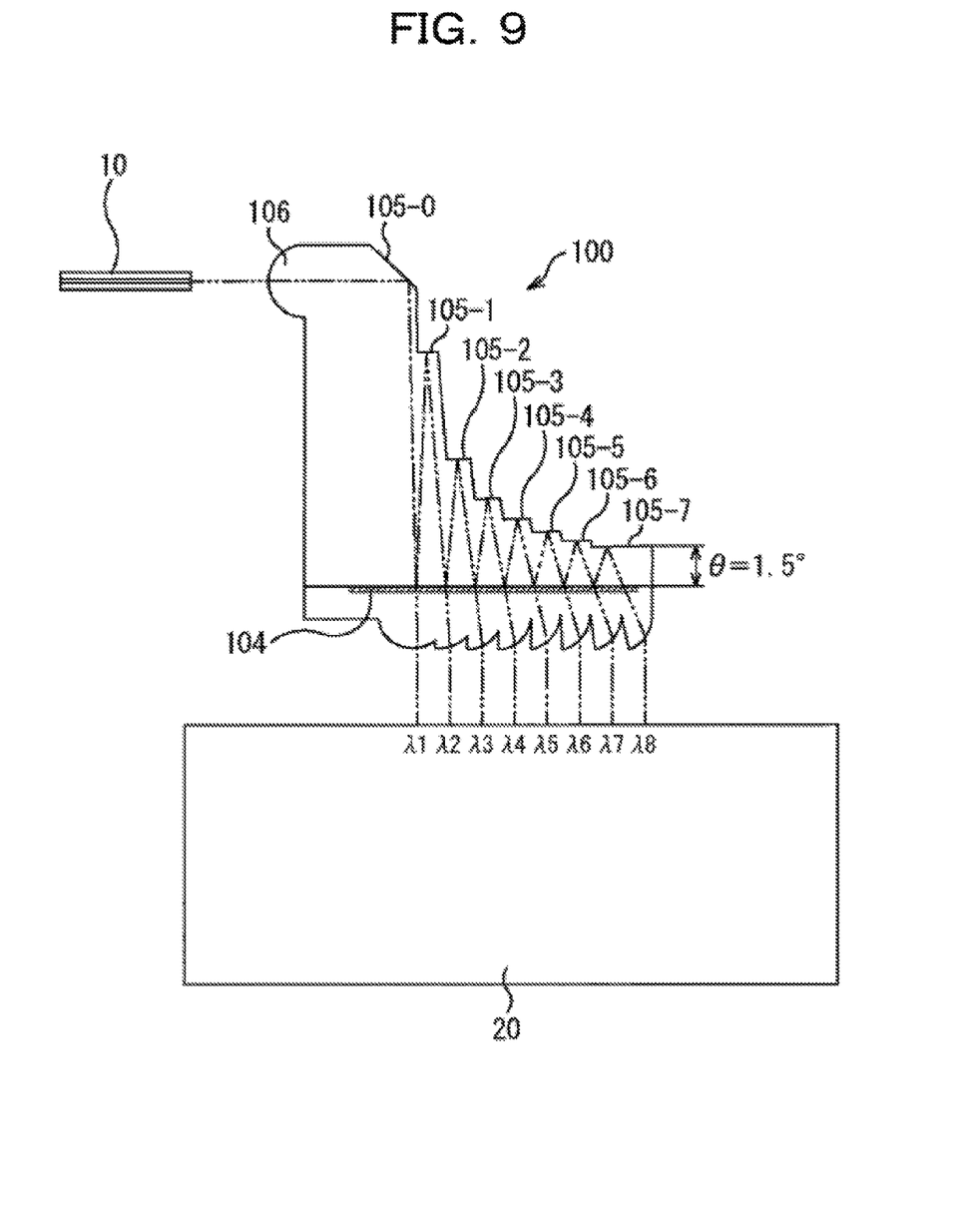
FIG. 9 illustrates an exemplary wavelength multiplexer/de-multiplexer.
Figure 10:
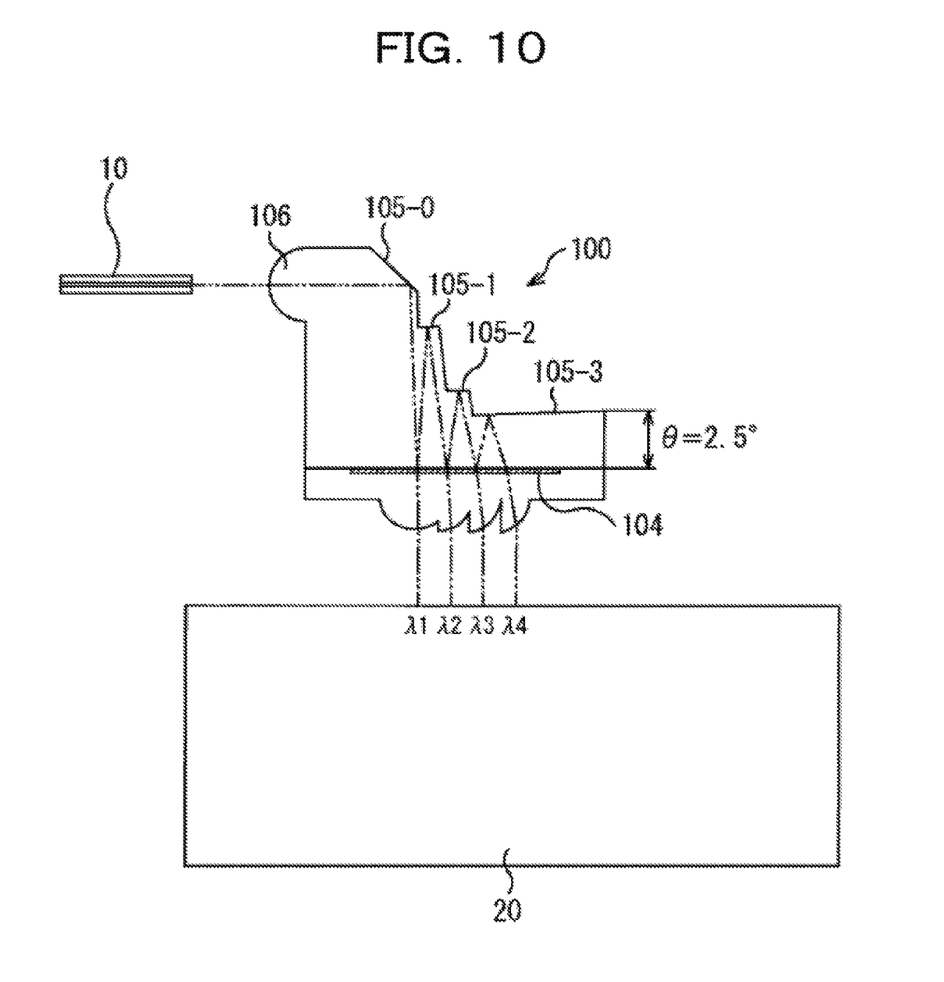
FIG. 10 illustrates another exemplary wavelength multiplexer/de-multiplexer.

FIG. 9 and FIG. 10 illustrate exemplary wavelength multiplexers/de-multiplexers. The wavelength multiplexer/de-multiplexer illustrated in FIG. 9 is capable of corresponding to optical signals with eight wavelengths $\lambda 1$ to $\lambda 8$. The wavelength multiplexer/de-multiplexer illustrated in FIG. 10 is capable of corresponding to optical signals with four wavelengths $\lambda 1$ to $\lambda 4$. In FIG. 9 and FIG. 10, the pitch between the optical elements is 250 μm and a distance between the optical fiber 10 and the lens 106 is 600 μm. In FIG. 9, the inclination angle θ of each of the reflection surfaces 105-1 to 105-7 with respect to the optical filter 104 is 1.5° and a distance between the optical path, which is formed by the optical fiber 10 and the lens 106, and a transmission/reception surface of the optical circuit board 20 is 3,500 μm. In FIG. 10, the inclination angle θ of each of the reflection surfaces 105-1 to 105-3 with respect to the optical filter 104 is 2.5° and a distance between the optical path, which is formed by the optical fiber 10 and the lens 106, and a transmission/reception surface of the optical circuit board 20 is 2,500 μm.

Figure 11:
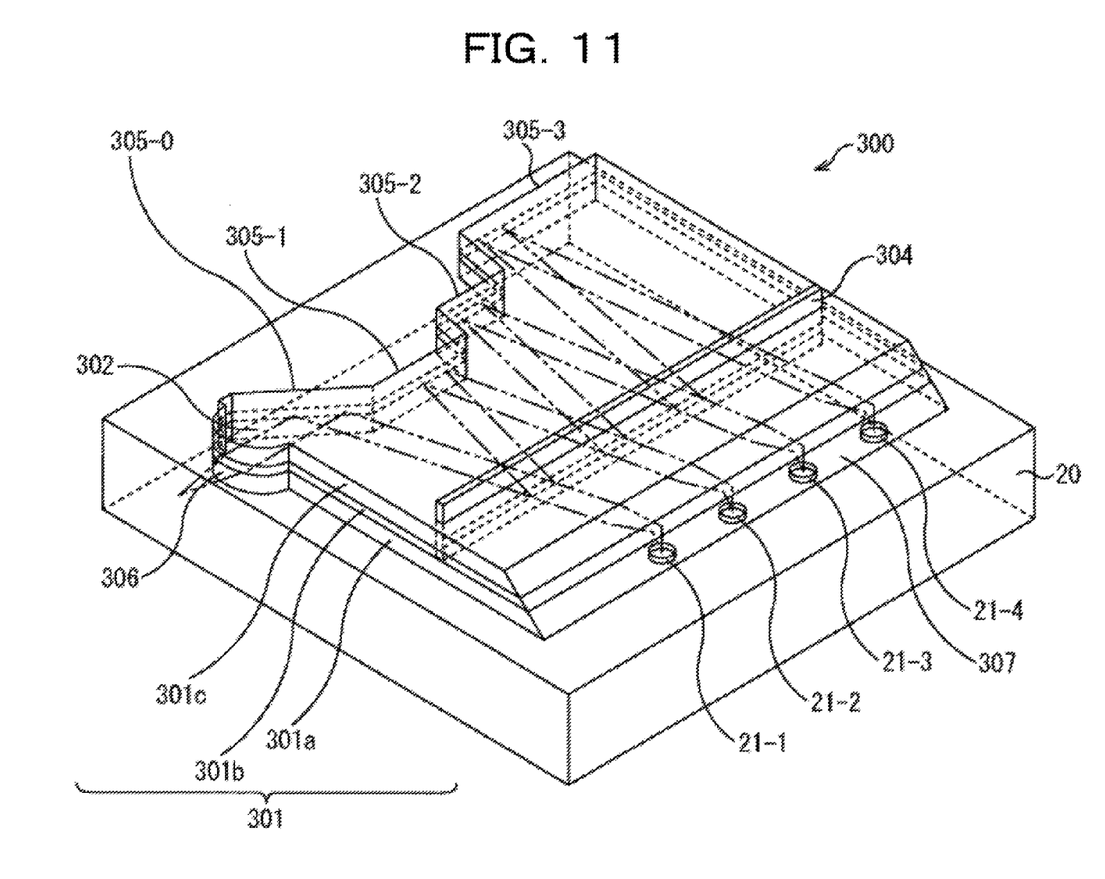
FIG. 11 illustrates another example of a perspective view of a wavelength multiplexer/de-multiplexer.
Figure 12:
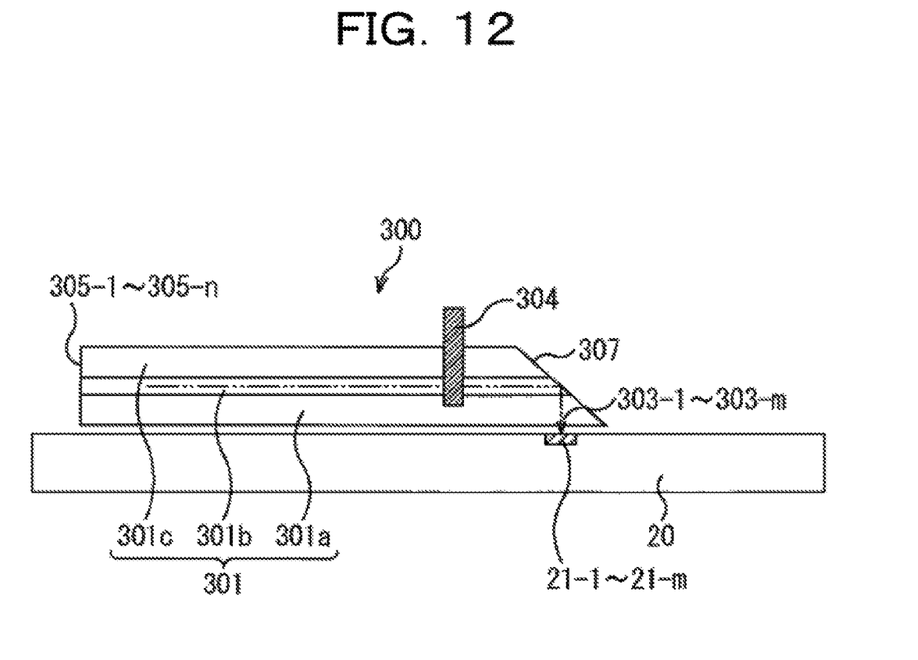
FIG. 12 illustrates another example of a cross-sectional view of the wavelength multiplexer/de-multiplexer.

FIG. 11 illustrates another example of a perspective view of a wavelength multiplexer/de-multiplexer. FIG. 12 illustrates another example of a cross sectional view of the wavelength multiplexer/de-multiplexer.

As illustrated in FIG. 11, a wavelength multiplexer/de-multiplexer 300 includes a reflection member 301, a port 302 provided in the reflection member 301, and m ports 303-1 to 303-$m$ provided in the reflection member 301 to be spaced apart from the port 302. For example, a lens 306 is provided in the port 302 and a 45° reflection surface 307 is formed in the ports 303-1 to 303-$m$. m is an integer number of two or more and is, for example, four in FIG. 11. The wavelength multiplexer/de-multiplexer 300 also includes an optical filter 304 on an optical path between the port 302 and the ports 303-1 to 303-$m$. A wavelength of the light transmitted through the optical filter 304 becomes shorter as an incidence angle increases due to a blue shift. In the reflection member 301, an input/output reflection surface 305-0 which reflects the light between the port 302 and the optical filter 304, and n reflection surfaces 305-1 to 305-$n$ which are inclined to the optical filter 304 and have different distances from the optical filter 304 are formed. n is an integer number of one or more and is, for example, three in FIG. 11.

For example, the inclination angles of the reflection surfaces 305-1 to 305-3 to the optical filter 304 may be substantially constant. For example, as the distance from the port 302 is increased, a distance of the reflection point from the optical filter 304 in each of the reflection surfaces 305-1 to 305-3 becomes larger and a reflection angle in each of the reflection surfaces 305-1 to 305-3 becomes smaller. Each of the ports 303-1 to 303-4 is positioned in the optical path of the light reflected by each of the reflection surfaces 305-0 to 305-3. The reflection member 301 includes a clad layer 301$a$, a core layer 301$b$, and a clad layer 301$c$ that are mutually stacked, a groove is formed in the stacked body and the optical filter 304 is inserted in the groove. For example, a dielectric multilayer film filter may be used as the optical filter 304. The dielectric multilayer film filter has a sharp selection ratio with respect to the wavelength. The port 302 may be an example of a first port and the ports 303-1 to 303-$m$ may be an example of a second port.

In FIG. 11, the reflection member 301 includes the clad layer 301$a$, the core layer 301$b$, and the clad layer 301$c$ that are mutually stacked. For example, a block-shaped member formed of transparent material is used in FIG. 1 to FIG. 3 and FIG. 7 and FIG. 8 while a slab optical waveguide is used in FIG. 11. Light freely propagates in an in-plane direction of the slab optical waveguide.

Similar to FIG. 1 to FIG. 3, the port 302 is coupled to an optical fiber and as illustrated in FIG. 12, an optical circuit board 20 is disposed to face the ports 303-1 to 303-$m$.

Substantially the same effect as that of the wavelength multiplexer/de-multiplexer illustrated in FIG. 1 to FIG. 3 may also be obtained in the wavelength multiplexer/de-multiplexer illustrated in FIG. 11 and FIG. 12. The reflection surfaces 305-0 to 305-$n$ and a 45° reflection surface 307 may be formed by etching a stacked body formed by, for example, the clad layer 301$a$, the core layer 301$b$, and the clad layer 301$c$. When the clad layer 301$a$, the core layer 301$b$, and the clad layer 301$c$ are made of light sensitive material, the reflection surfaces 305-0 to 305-$n$ may be formed by conducting mask exposure and development.

As illustrated in FIG. 1 to FIG. 3, as the distance from the port 302 is increased, a distance of the reflection point from the optical filter 304 in each of the reflection surfaces 305-1 to 305-3 may become smaller and a reflection angle in each of the reflection surfaces 305-1 to 305-3 may become larger.

According to the configuration as described above, reduction in the number of components and miniaturization is implemented in a wavelength multiplexer/de-multiplexer suitable for the WDM communication. The WDM optical module may be miniaturized. Since the degree of freedom for designing the wavelength multiplexers/de-multiplexers becomes wider, a wider degree of freedom for designing the position, the pitch and the like of the optical elements of the optical circuit board may be secured and thus, an area of the optical circuit board may be effectively used. The wavelength multiplexer/de-multiplexer is mounted on the optical circuit board so as to cause the WDM to be done and thus, a special circuit may not be required for the optical circuit board. For example, a WDM transmission module on which the wavelength multiplexer/de-multiplexer is mounted and a parallel transmission module on which the wavelength multiplexer/de-multiplexer is not mounted may be individually prepared on the same optical circuit board.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A wavelength multiplexer and de-multiplexer comprising:
   a reflection member;
   a first port provided in the reflection member and configured to receive light;
   a plurality of second ports provided in the reflection member to be spaced apart from the first port; and
   an optical filter on an optical path between the first port and the plurality of second ports and provided in such a manner that the first port does not face the optical filter,
   wherein a plurality of reflection surfaces inclined with respect to the optical filter are formed in the reflection member,
   a distance of a reflection point from the optical filter in each of the plurality of reflection surfaces becomes smaller as a reflection angle in each of the plurality of reflection surfaces is increased, and
   each of the plurality of second ports is positioned on a path of light reflected by each of the plurality of reflection surfaces,
   wherein as a distance from the first port is increased, a distance of the reflection point from the optical filter in each of the plurality of the reflection surfaces becomes smaller and a reflection angle in each of the plurality of the reflection surfaces becomes larger.

2. The wavelength multiplexer and de-multiplexer according to claim 1, wherein an inclination angle of the plurality of reflection surfaces with respect to the optical filter is constant.

3. The wavelength multiplexer and de-multiplexer according to claim 1, wherein the reflection member includes a block-shaped member formed of a transparent material and constituting the optical path.

4. The wavelength multiplexer and de-multiplexer according to claim 1, wherein the reflection member includes a slab optical waveguide constituting the optical path.

5. The wavelength multiplexer and de-multiplexer according to claim 1, further comprising:
   an input-and-output reflection surface configured to be directly coupled to the first port and reflect, to the optical filter, light which passes the first port.

6. The wavelength multiplexer and de-multiplexer according to claim 1, further comprising:
   an input-and-output reflection surface provided nearer the optical filter than the plurality of reflection surfaces and having a first inclination angle with respect to the optical filter which is different from second inclination angles of the plurality of reflection surfaces with respect to the optical filter which are constant.

7. A wavelength multiplexer and de-multiplexer comprising:
   a reflection member;
   a first port provided in the reflection member;
   a plurality of second ports provided in the reflection member to be spaced apart from the first port; and
   an optical filter on an optical path between the first port and the plurality of second ports,
   wherein a plurality of reflection surfaces formed in the reflection member have first inclination angles with respect to the optical filter which are the same with each other,
   an input-and-output reflection surface formed in the reflection member is provided nearer the first port than the plurality of reflection surfaces and has a second inclination angle with respect to the optical filter which are different from the first inclination angles,
   a distance of a reflection point from the optical filter in each of the plurality of reflection surfaces becomes smaller as a reflection angle in each of the plurality of reflection surfaces is increased, and
   each of the plurality of second ports is positioned on a path of light reflected by each of the plurality of reflection surfaces.

8. The wavelength multiplexer and de-multiplexer according to claim 7,
   wherein as a distance from the first port is increased, a distance of the reflection point from the optical filter in each of the plurality of the reflection surfaces becomes larger and a reflection angle in each of the plurality of the reflection surfaces becomes smaller.

9. The wavelength multiplexer and de-multiplexer according to claim 7, wherein the second inclination angle is larger than first inclination angles.

10. An optical module comprising:
    a wavelength multiplexer/de-multiplexer including:
    a reflection member;
       a first port provided in the reflection member and configured to receive light;
       a plurality of second ports provided in the reflection member to be spaced apart from the first port; and
       an optical filter on an optical path between the first port and the plurality of second ports and provided in such a manner that the first port does not face the optical filter,
       wherein a plurality of reflection surfaces inclined with respect to the optical filter are formed in the reflection member,
       a distance of a reflection point from the optical filter in each of the plurality of reflection surfaces becomes smaller as a reflection angle in each of the plurality of reflection surfaces is increased, and each of the plurality of second ports is positioned on a path of light reflected by each of the plurality of reflection surfaces; and an optical circuit board provided with a plurality of optical elements configured to transmit and receive optical signals to and from the plurality of second ports, wherein as a distance from the first port is increased, a distance of the reflection point from the optical filter in each of the plurality of the reflection surfaces becomes smaller and a reflection angle in each of the plurality of the reflection surfaces becomes larger.

11. The optical module according to claim 10, wherein an inclination angle of the plurality of reflection surfaces with respect to the optical filter is constant.

12. The optical module according to claim 10, wherein the reflection member includes a block-shaped member formed of a transparent material and constituting the optical path.

13. The optical module according to claim 10, wherein the reflection member includes a slab optical waveguide constituting the optical path.

14. The optical module according to claim 10, wherein the reflection member includes an input-and-output reflection surface configured to be directly coupled to the first port and reflect, to the optical filter, light which passes the first port.

15. The optical module according to claim 10, wherein the reflection member includes an input-and-output reflection surface provided nearer the optical filter than the plurality of reflection surfaces and having a first inclination angle with respect to the optical filter which is different from second inclination angles of the plurality of reflection surfaces with respect to the optical filter which are constant.

\* \* \* \* \*